US011341062B2

(12) United States Patent
Yang et al.

(10) Patent No.: US 11,341,062 B2
(45) Date of Patent: May 24, 2022

(54) SYSTEM-ON-CHIP AND ACCELERATION METHOD FOR SYSTEM MEMORY ACCESSING (71) Applicant: Shanghai Zhaoxin Semiconductor Co., Ltd., Shanghai (CN)

(72) Inventors: Qunyi Yang, Shanghai (CN); Hui Wu, Beijing (CN); Tingli Cui, Shanghai (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 143 days.

(21) Appl. No.: 17/015,176

(22) Filed: Sep. 9, 2020

(65) Prior Publication Data
US 2022/0004505 A1  Jan. 6, 2022

(30) Foreign Application Priority Data

Jul. 1, 2020  (CN) .......................... 202010624632.0

(51) Int. Cl.
*G06F 12/12*  (2016.01)
*G06F 12/10*  (2016.01)
*G06F 12/123*  (2016.01)
*G06F 12/1027*  (2016.01)
*G06F 12/122*  (2016.01)

(52) U.S. Cl.
CPC .......... *G06F 12/123* (2013.01); *G06F 12/10* (2013.01); *G06F 12/1027* (2013.01); *G06F 12/122* (2013.01); *G06F 12/124* (2013.01); *G06F 2212/1044* (2013.01)

(58) Field of Classification Search
CPC .... G06F 12/122; G06F 12/123; G06F 12/124; G06F 12/125; G06F 12/10; G06F 12/1027
See application file for complete search history.

(56) References Cited

U.S. PATENT DOCUMENTS 10,558,579 B1*  2/2020  Goli .................... G06F 12/0893
2012/0131306 A1*  5/2012  Bratt ................... G06F 12/1027
                                                       711/205

(Continued)

OTHER PUBLICATIONS

Caching Policy Optimization for Rate Adaptive Video Streaming by Su (Year: 2016).*

(Continued)

*Primary Examiner* — Paul M Knight
(74) *Attorney, Agent, or Firm* — McClure, Qualey & Rodack, LLP (57) ABSTRACT An acceleration technology for accessing system memory, which provides translation agent hardware that calculates the physical address of the system memory based on an access request issued from the device end. The translation agent hardware has a cache memory that stores information to speed up the calculation of the physical address. Each cache line corresponds to a last-recently used (LRU) index value, and the cache line with the greatest LRU index value is preferentially released to be reassigned. A counter counts a count value to show an isochronous caching demand. LRU index values of cache lines assigned to non-isochronous caching are kept not lower than the count value, and thereby isochronous caching takes precedence over non-isochronous caching.

20 Claims, 10 Drawing Sheets (56) References Cited

U.S. PATENT DOCUMENTS

| | | | | |
|---|---|---|---|---|
| 2013/0254491 A1* | 9/2013 | Coleman | ............... | G06F 12/123 |
| | | | | 711/133 |
| 2017/0235681 A1* | 8/2017 | Kaburaki | ............ | G06F 12/0292 |
| | | | | 711/128 |
| 2019/0303303 A1* | 10/2019 | Krishnan | ............ | G06F 12/0833 |
| 2021/0157725 A1* | 5/2021 | Barbalho | ............ | G06F 12/0802 |
| 2021/0303467 A1* | 9/2021 | Mandal | ............... | G06F 12/0888 |

OTHER PUBLICATIONS

S-LRU: A Cache Replacement Algorithm of Video Sharing System for Mobile Devices by Guo (Year: 2012).*
SARC: Sequential Prefetching in Adaptive Replacement Cache by Gill (Year: 2005).*
Generalization of LRU Cache Replacement Policy with Applications to Video Streaming by Friedlander (Year: 2018).*
Support for PREM on contemporary multicore COTS systems by Dolezal (Year: 2019).*
Synchronous, Asynchronous, Isochronous. What Does it Mean? by Bucaro (Year: 2018).*
A Replacement Policy for Buffer Management in IPTV Services by Babu (Year: 2013).*

* cited by examiner

| Entry# | LRU index value |
|---|---|
| 0 | 7 |
| 1 | 6 |
| 2 | 5 |
| 3 | 4 |
| 4 | 3 |
| 5 | 2 |
| 6 | 1 |
| 7 | 0 |

404

| 0 |
|---|

| Entry# | LRU index value |
|---|---|
| 0 | 7 |
| 1 | 6 |
| 2 | 5 |
| 3 | 4 |
| 4 | 3 |
| 5 | 2 |
| 6 | 1 |
| 7 | 0 |

404

| 0 |
|---|

502

| Entry# | LRU index value |
|---|---|
| 0 | 0 |
| 1 | 7 |
| 2 | 6 |
| 3 | 5 |
| 4 | 4 |
| 5 | 3 |
| 6 | 2 |
| 7 | 1 |

504

| 1 |
|---|

SYSTEM-ON-CHIP AND ACCELERATION METHOD FOR SYSTEM MEMORY ACCESSING

CROSS REFERENCE TO RELATED APPLICATIONS

This application also claims priority of China Patent Application No. 202010624632.0, filed on Jul. 1, 2020, the entirety of which is incorporated by reference herein.

BACKGROUND OF THE INVENTION

Field of the Invention

The present invention is related to accessing storage, and in particular it is related to the acceleration of accessing system memory in cases where the access request is issued from the device end.

Description of the Related Art

An electronic device usually issues a virtual address to access system memory (e.g., a DDR). The virtual address is indicated in an access request and needs to be translated to a physical address. The translation information required in the address translation is generally stored in the system memory. Accessing the system memory for the translation information is quite time-consuming and wastes resources. However, real-time response is critical for isochronous devices. For example, fluent video and audio are important for video and audio players, and a high response speed is necessary for USB devices. Redundantly accessing translation information from system memory significantly slows down the response speed of isochronous devices.

How to respond to an access request in real time to rapidly access a system memory is an important issue in the field.

BRIEF SUMMARY OF THE INVENTION

In the present invention, the hardware of a translation agent is provided to deal with an access request that is issued from the device end to access a system memory. The translation agent hardware rapidly calculates a physical address of the system memory. In particular, the translation agent hardware includes a cache memory, which temporarily stores the translation information for calculation of the physical address. In some examples, the translation result may be also cached in the cache memory. Thus, the redundant access to the system memory is reduced. Specifically, the cache memory is utilized according to a priority policy. Isochronous caching takes precedence over non-isochronous caching.

In an exemplary embodiment, the translation agent includes hardware for cache management, using which each cache line is assigned a last-recently used (LRU) index value. Cache lines with greater LRU index values are preferentially released to be reassigned. The translation agent hardware also has a counter, which provides a count value to show an isochronous caching demand to use the cache lines of the cache memory.

In an exemplary embodiment, the counter counts the number of cache lines assigned to isochronous caching. The LRU index values of the different cache lines have integers from zero to (N−1) for setting. N is the total amount of cache lines. The LRU index values of the different cache lines are different and are decremented from the start cache line to the end cache line in the initial setting.

When an empty cache line is assigned to correspond to a non-isochronous device, its LRU index value may be set to the count value, and the LRU index values of the other cache lines not lower than the count value may be all incremented by 1.

When a cache line corresponding to a first non-isochronous device is called by a second non-isochronous device, its LRU index value may be changed from a reference value to the count value, and the LRU index values of the other cache lines lower than the reference value without being lower than the count value may be all incremented by 1.

When a cache line corresponding to an isochronous device is called by a non-isochronous device, its LRU index value may be changed from a reference value to zero, and the LRU index values of the other cache lines lower than the reference value may be all incremented by 1.

When an empty cache line is assigned to correspond to an isochronous device, its LRU index value may be set to zero, and the LRU index values of the other cache lines may be all incremented by 1.

When a cache line corresponding to a first isochronous device is called by a second isochronous device, its LRU index value may be changed from a reference value to zero, and the LRU index values of the other cache lines lower than the reference value may be all incremented by 1.

When a cache line corresponding to a non-isochronous device is called by an isochronous device, its LRU index value may be changed from a reference value to zero, and the LRU index values of the other cache lines lower than the reference value may be all incremented by 1.

When a cache line with the greatest LRU index value is released and assigned to correspond to an isochronous device, its LRU index value may be changed to zero, and the LRU index values of the other cache lines may be all incremented by 1.

When a cache line with the greatest LRU index value is released and assigned to correspond to a non-isochronous device, its LRU index value may be changed to the count value, and the LRU index values of the other cache lines greater than the count value may be all incremented by 1.

In an exemplary embodiment, the count value has an upper limit, to prevent all cache lines of the cache memory from being occupied by isochronous caching.

When no isochronous devices request access to the system memory during a time limit, the count value may be reset to zero.

In another exemplary embodiment, a method to access a system memory, comprising: providing translation agent hardware to calculate the physical address in response to an access request for the system memory, wherein based on the physical address a central processing unit operates a memory controller to access the system memory; providing a cache memory in the translation agent hardware, wherein the cache memory provides a plurality of cache lines to store translation information for calculation of the physical address; assigning each cache line a last-recently used (LRU) index value, wherein cache lines with greater LRU index values are preferentially released to be reassigned; counting a count value to show an isochronous caching demand to use the cache lines of the cache memory; and keeping LRU index values of cache lines assigned to non-isochronous caching not lower than the count value, and thereby isochronous caching takes precedence over non-isochronous caching.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
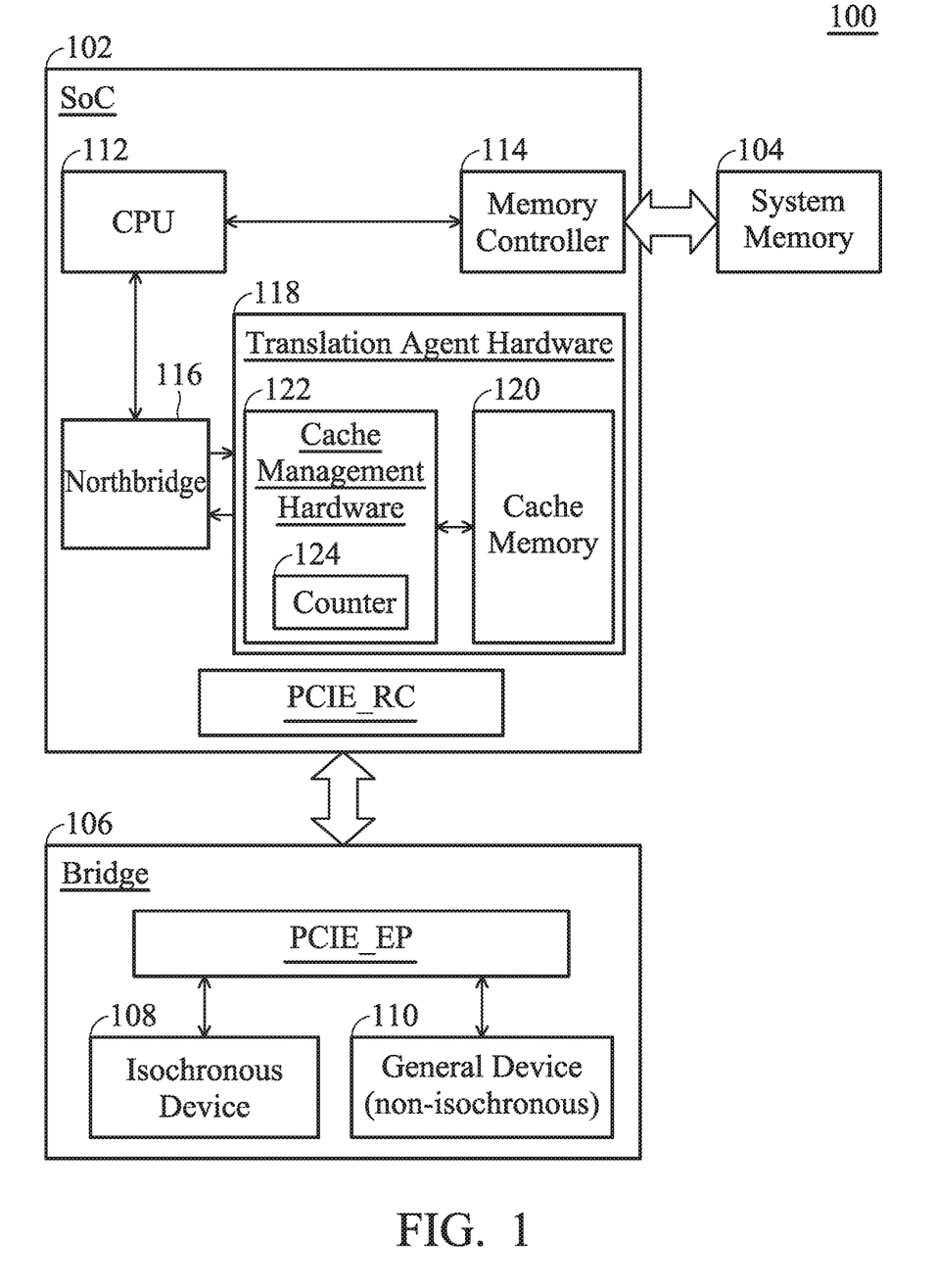
FIG. 1 depicts an electronic device 100 in accordance with an exemplary embodiment of the present invention.

FIG. 1 depicts an electronic device 100 in accordance with an exemplary embodiment of the present invention. The host end includes a system memory 104. A system-on-chip (SoC) 102 operates the system memory 104. A bridge 106 is coupled to the SoC 102. At the device end, there is an isochronous device 108 and a general (i.e., non-isochronous) device 110, which are coupled to the system-on-chip 102 by the bridge 106. Compared with the general device 110, real-time issues are important for the isochronous device 108. For example, video and audio players should provide fluent video and audio, and USB devices should be high speed. The video and audio players and USB devices are all isochronous devices. The isochronous device 108 and the general device 110 access the system memory 104 through the system-on-chip 102. Although the drawing only shows one isochronous device 108 and one general device 110, there may be multiple isochronous devices and multiple general devices in actual applications. The system performance is significantly affected by the system memory 104 accessing issued by the device end.

In FIG. 1, the system-on-chip 102 includes a central processing unit (CPU) 112, a memory controller 114, a chipset (only Northbridge 116 is shown in the figure but not intended to be limited thereto), a PCIE root complex PCIE RC, and translation agent hardware 118. The PCIE root complex PCIE RC is coupled to the PCIE endpoint PCIE EP on the bridge 106 and thereby the isochronous device 108 and the general device 110 communicate with the system-on-chip 102 through the high-speed serial computer expansion bus standard (PCIE). The Northbridge 116 operates the translate agent hardware 118 to translate an access request (issued by the isochronous device 108 or the general device 110 to access the system memory 104) to output a physical address of the system memory 104. The central processing unit 112 operates the memory controller 114 to access the system memory 104 according to the physical address.

The isochronous device 108 or the general device 110 at the device end may issue an access request that indicates a virtual address to access the system memory 104 through the system-on-chip 102, that is, the access request includes the access request of the isochronous device 108 and the access request of the general device 110. The translation agent hardware 118 translates the virtual address indicated in the access request to a physical address of the system memory 104. The translation information generally is stored in the system memory 104. In the present invention, the translation agent hardware 118 provides a cache memory 120 to cache the translation information from the physical address and thereby redundant accessing of the system memory 104 is reduced. In some exemplary embodiments, the translation result may be also cached in the cache memory 120 to respond to the access request in real time.

The translation agent hardware 118 includes a hardware 122 for cache management of the cache memory 120. The cache memory 120 is managed by the cache management hardware 122. The cache memory 120 provides cache lines to store the translation information. The cache management hardware 122 assigns each cache line a last-recently used (LRU) index value. The cache lines with the greater LRU index values are preferentially released to be reassigned. The LRU index value of each cache line is set based on the isochronous level of the cached translation information.

As shown, the cache management hardware 122 has a counter 124. The count value of the counter 124 is the number of cache lines that should be reserved for the isochronous caching, which also shows an isochronous caching demand to use the cache lines of the cache memory 120. In another exemplary embodiment of the present invention, the counter 124 is an external device coupled to the cache management hardware 122. The cache management hardware 122 sets the LRU index values of the cache lines of the cache memory 120 based on the count value obtained from the counter 124. The cache management hardware 122 sets the LRU index value of non-isochronous caching (e.g., corresponding to the general device 110) not lower than the count value obtained the counter 124, so that cache lines of non-isochronous caching are preferentially released to be reassigned. The isochronous caching (e.g., corresponding to the isochronous device 108), therefore, takes precedence over the non-isochronous caching.

The communication interface between the host end and the device end is not limited to the high-speed serial computer expansion bus standard (PCIE). The translation agent hardware 118 may further have the capability of answering access requests transferred through the other communication interfaces to access the system memory 104.

In an exemplary embodiment, the system memory 104 may be a high-speed storage controlled by the memory controller 114. In another embodiment, the system memory 104 is a high-speed storage controlled by Northbridge 116. For example, the memory controller 114 may be integrated in the Northbridge 116.

In an exemplary embodiment, the central processing unit 122 may include an integrated chipset. The Northbridge 116 may be implemented in various ways.

In another exemplary embodiment, the device-end hardware may be integrated into the system-on-chip 102. For example, the isochronous device 108 and the general device 110 may be integrated into the system-on-chip 102 together with the host-end computing core.

In an exemplary embodiment, the electronic device 100 may run multiple operating systems (OS), corresponding to the non-identical device-end hardware. Not limited to the architecture shown in FIG. 1, another number of isochronous devices and another number of general devices may be used. Based on the identification information SID (e.g., bus number, device number, function number, and so on), the translation agent hardware 118 may recognize the computing domain (e.g., the OS) of a device. In the same computing domain, the same virtual address issued by the different devices to access the system memory 104 will be converted to the same physical address.

Figure 2:
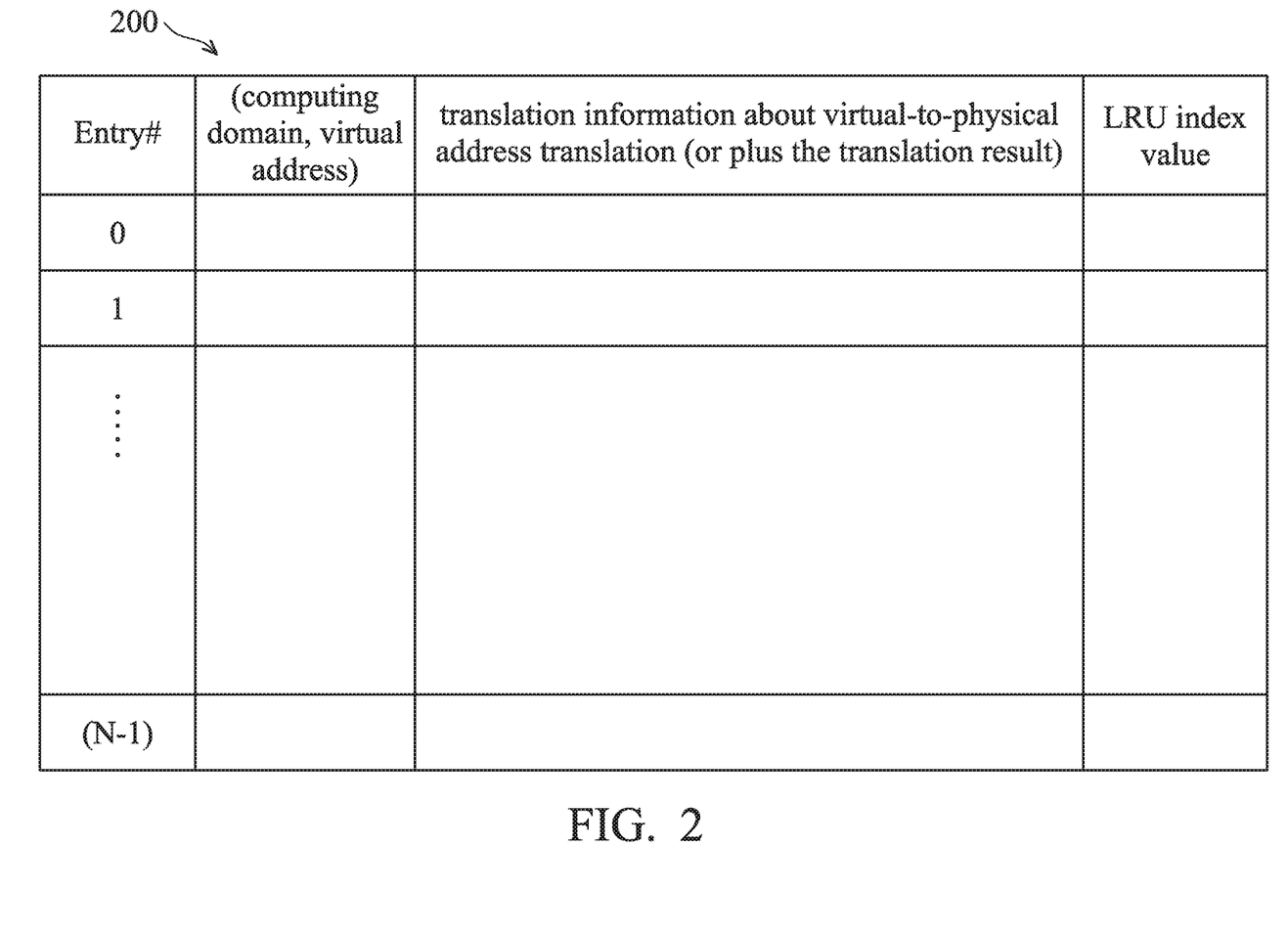
FIG. 2 illustrates a cache data structure 200 of the cache memory 120 in accordance with an exemplary embodiment of the present invention.

FIG. 2 illustrates a cache data structure 200 of the cache memory 120 in accordance with an exemplary embodiment of the present invention. The cache memory 120 includes cache lines. Each cache line may be assigned to correspond to an access request. The translation agent hardware 118 analyzes the computing domain of the access request, and obtains a virtual address from the access request to be interpreted in the computing domain. Based on the computing domain and the virtual address, the translation agent hardware 118 acquires translation information from the system memory 104. According to the translation information, the translation agent hardware 118 calculates a physical address. The cache management hardware 122 caches the translation information and even the calculated physical address to the corresponding cache line in the cache memory 120 and adjusts the LRU index values of all cache lines. All the LRU index values are organized into an LRU index management table. Each LRU index value listed in the LRU index management table corresponds to a cache line. In another exemplary embodiment, the LRU index management table is stored in another storage area managed by the cache management hardware 122. For example, the LRU index management table may be stored in a statistic random access memory (SRAM).

In an exemplary embodiment, the system memory 104 may be a large-sized memory. The calculation of the physical address may involve multi-level calculations. For example, translation of the higher bits of the virtual address may be performed prior to the translation of the lower bits of the virtual address. After coarse translation is performed, and the fine.

Figure 3A:
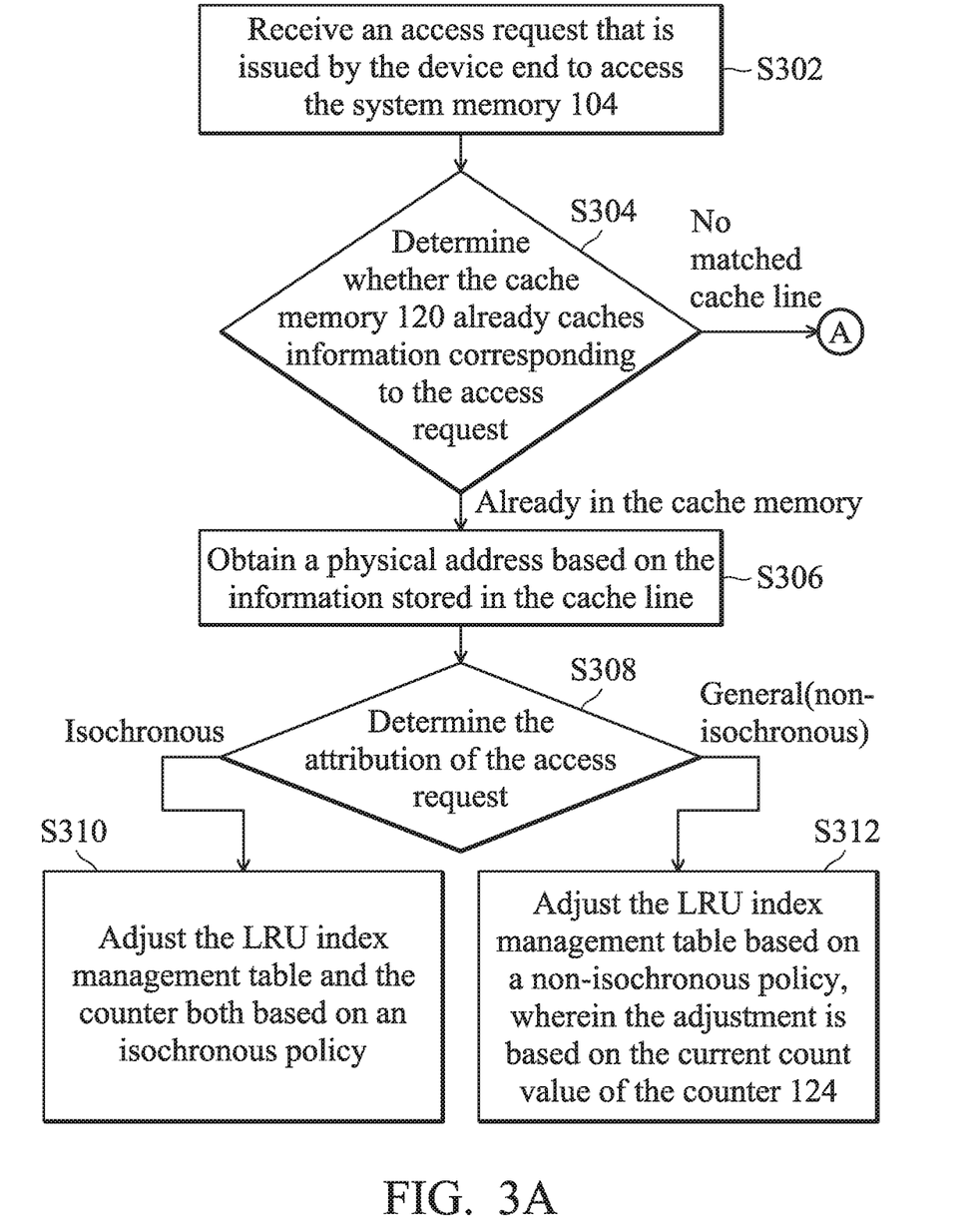
FIGS. 3A and 3B are flowcharts illustrating the operations of the translation agent hardware 118 in accordance with an exemplary embodiment of the present invention.
Figure 3B:
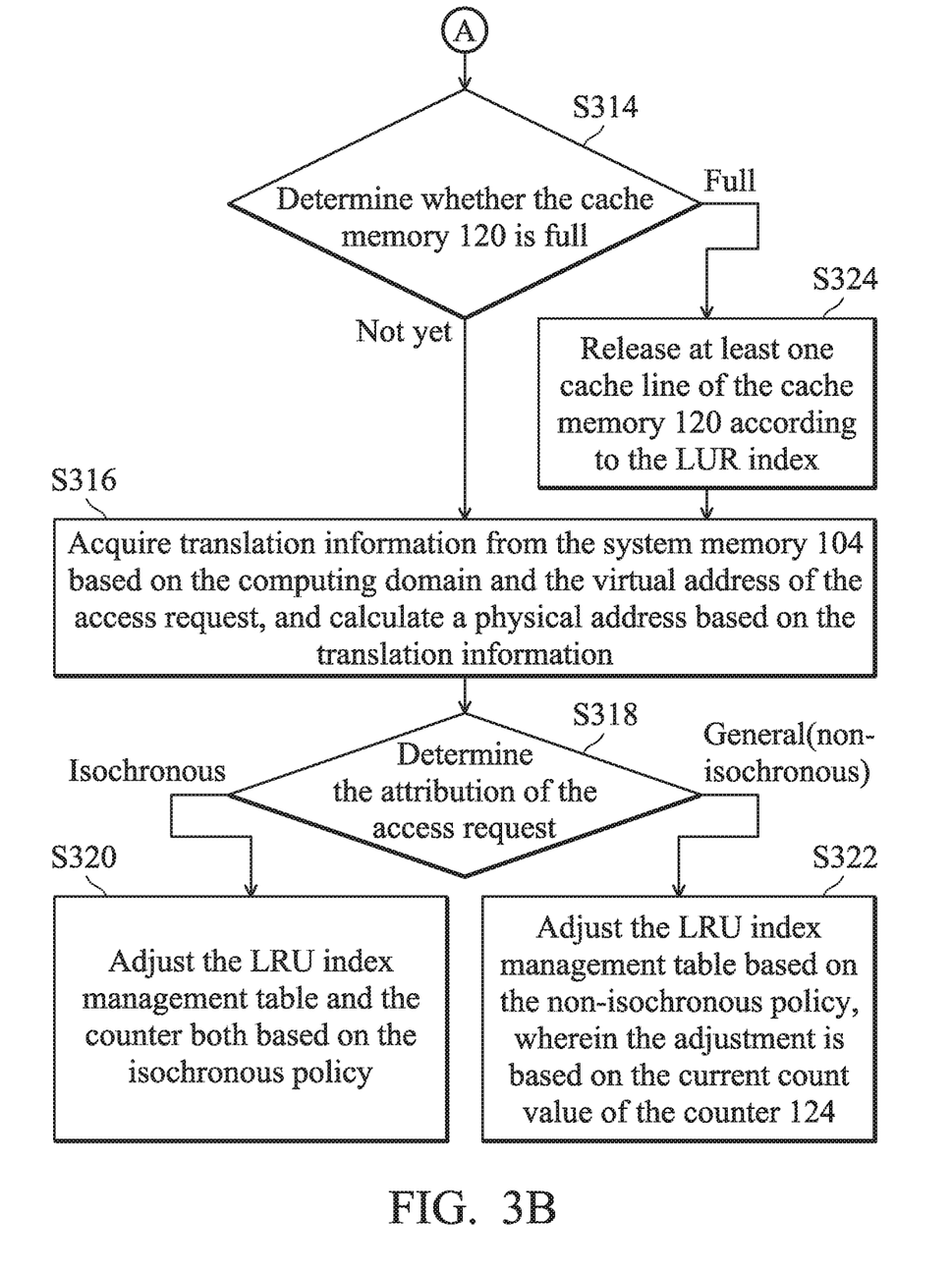

The present invention provides different caching policies for isochronous caching and general (non-isochronous) caching. FIGS. 3A and 3B are flowcharts illustrating the operations of the translation agent hardware 118 in accordance with an exemplary embodiment of the present invention.

In step S302, the translation agent hardware 118 receives an access request that is issued by the device end to access the system memory 104.

In step S304, the cache management hardware 122 determines whether the cache memory 120 already caches information corresponding to the access request. In an exemplary embodiment, the cache memory 120 is searched according to the computing domain and the virtual address of the access request.

If any cache line hits the access request, step S306 is performed. The translation agent hardware 118 obtains a physical address based on the information stored in the cache line. For example, the cache line may contain translation information required by the access request. The translation agent hardware 118 may acquire the translation information from the cache line and calculates a physical address based on the translation information. There is no need to access the system memory 104 for the translation information. In another exemplary embodiment, the cache line may store the physical address. The translation agent 118 directly acquires the cached physical address without further calculations.

In step S308, the cache management hardware 122 determines the attribution of the access request. If it is an access request issued by an isochronous device, the flow proceeds to step S310 (corresponding to an isochronous policy) to adjust the LRU index management table and the counter both. If it is an access request issued by a general device, the flow proceeds to step S312 (corresponding to a non-isochronous policy) to adjust the LRU index management table based on the current count value of the counter 124.

If no cache line hits the access request or the requested cache line does not exist, as indicated by step A, the flow proceeds to the steps of FIG. 3B. In step S314, the cache management hardware 122 determines whether the cache memory 120 is full. If not, the flow proceeds to step S316. In step S316, the translation agent hardware 118 acquires translation information from the system memory 104 based on the computing domain and the virtual address of the access request, and calculates a physical address based on the translation information. In particular, the cache management hardware 122 stores the translation information and even the calculated physical address in the cache memory 120.

In step S318, the cache management hardware 122 determines the attribution of the access request. If it is an access request issued by an isochronous device, the flow proceeds to step S320 (corresponding to an isochronous policy) to adjust the LRU index management table and the counter both. If it is an access request issued by a general device, the flow proceeds to step S322 (corresponding to a non-isochronous policy) to adjust the LRU index management table based on the current count value of the counter 124.

When it is determined in step S314 that the cache memory 120 is full, step S324 is performed. The cache management hardware 122 releases at least one cache line of the cache memory 120 according to the LUR index. For example, the cache line with the greatest LRU index value is released. Then, the flow proceeds to step S316 and the subsequent steps. The translation information of the current access request is programmed into the released cache line.

FIGS. 4 to 12 illustrate the management of the LRU index management table, which is based on the count value of the counter 124. The counter 124 counts the number of cache lines in the cache memory 120 which have been mapped to isochronous caching. An LRU index value may be an integer selected from zero to (N−1). The different cache lines of the cache memory 120 should be assigned the different LRU index values. N is the total number of cache lines owned by the cache memory 120. In the figure, N is 8. The LRU index value may be 0 to 7. In this example, the count value has an upper limit (that is, less than N−1). Thus, the cache lines of the cache memory 120 will not be all occupied by isochronous caching.

Figure 4:
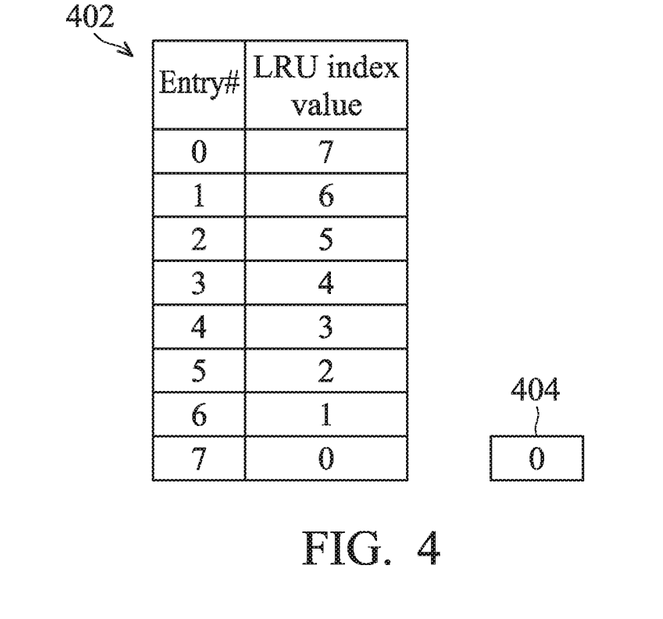
FIGS. 4 to 12 illustrate the management of the LRU index management table, which is based on the count value of the counter 124.

FIG. 4 shows the initial LRU index management table 402 and the initial count value 404. The LRU index value decreases from the start cache line (number 0) to the end cache line (number 7). The count value 404 is 0.

Figure 5:
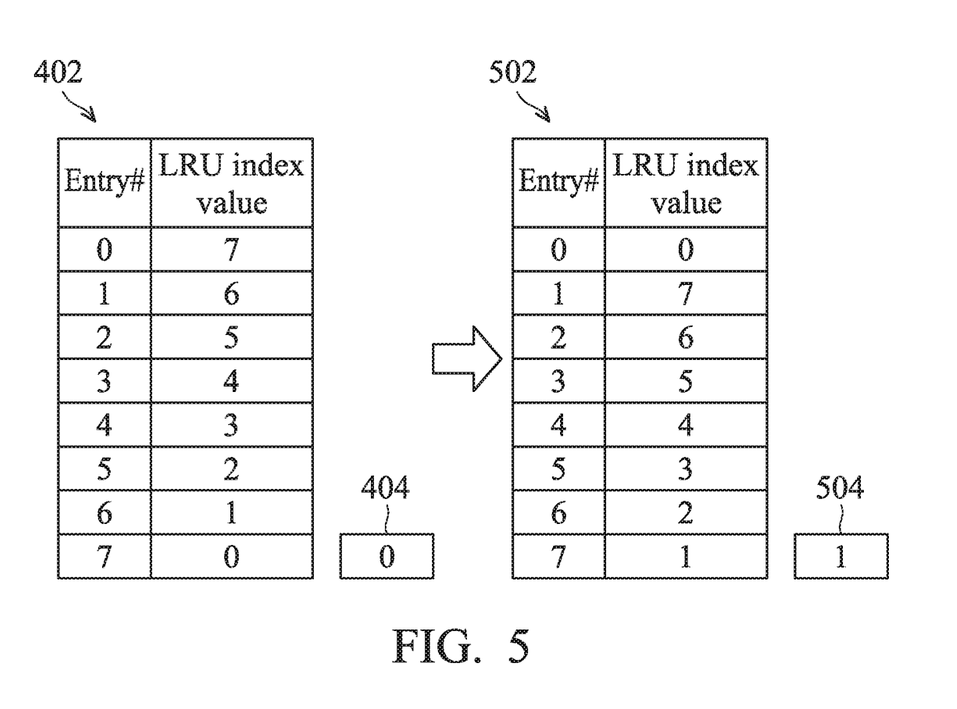

FIG. 5 shows that the LRU index management table changes from table 402 to table 502 and the count value increases (as indicated by numbers 404 and 504) when an access request is issued by an isochronous device. Cache line 0 of the cache memory 120 is assigned to correspond to the access request issued by the isochronous device, and the LRU index value of the cache line is set to zero (7→0). The LRU index values of the other cache lines are all incremented by 1. Thus, the isochronous device corresponds to the lowest LRU index value and the translation information of the isochronous device is guaranteed to be cached in the cache memory 120 to answer the future access requests issued by the same isochronous device to access the system memory 104. In some examples, the count value is at the upper limit before the access request. The count value at the upper limit is not incremented in response to the access request.

Figure 6:
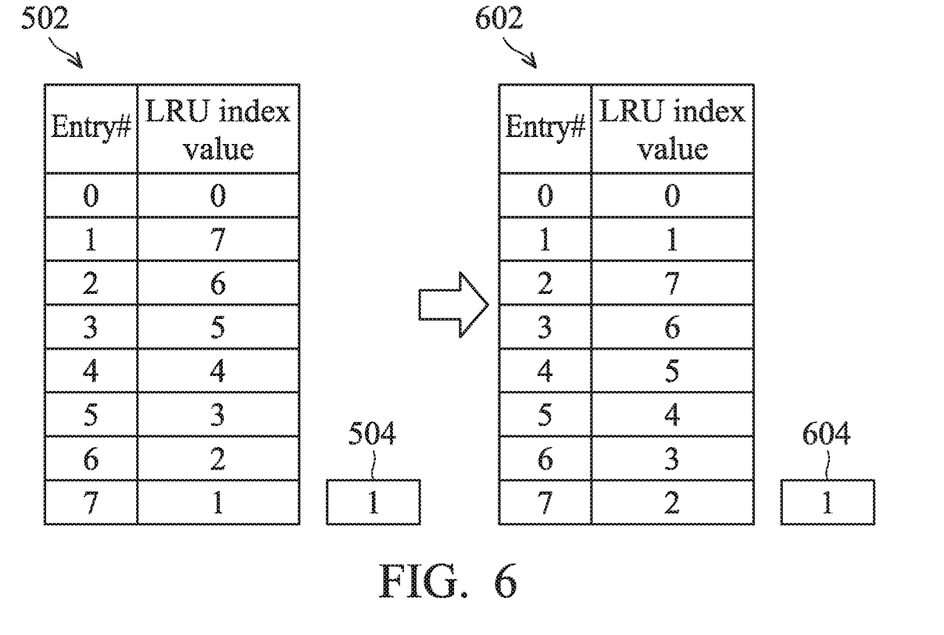

FIG. 6 shows that the LRU index management table changes from table 502 to table 602 when an access request is issued by a general device. As shown, cache line 1 is assigned to the access request. The count value is not changed (as indicated by numbers 504 and 604). Corresponding to the general device, the change made on the LRU index management table (changed from 502 to 602) is based on the count value which is 1 now. The LRU index value of the cache line 1 is set to the count value (7→1). Referring to the other cache lines, the LRU index values not lower than 1 are all incremented by 1. As shown, the LRU index values of cache lines 2 to 7 are all incremented by 1. Because the LRU index value of the general device is set to the current count value, isochronous caching takes precedence over non-isochronous caching.

Figure 7:
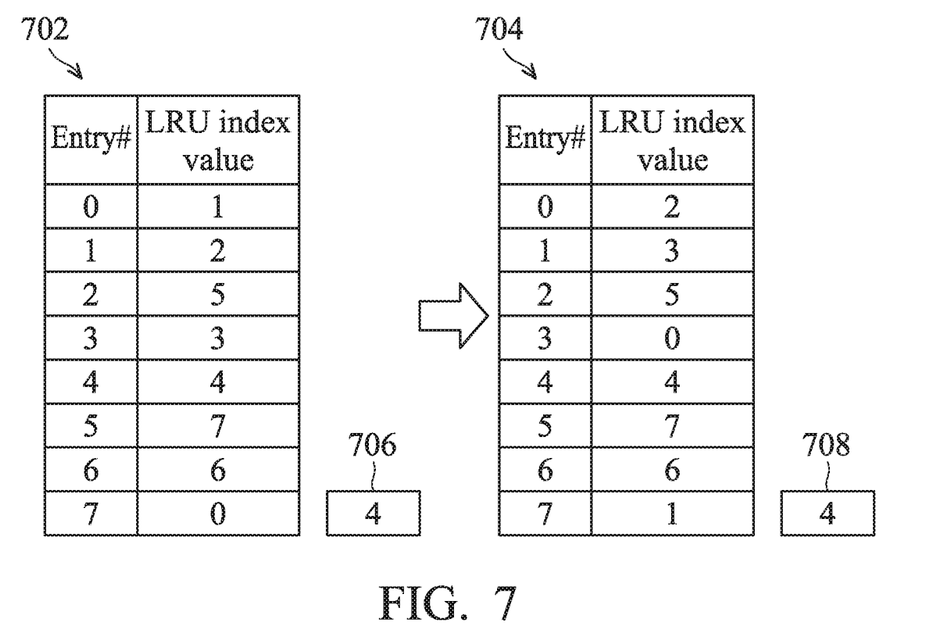

FIG. 7 shows that the LRU index management table changes from table 702 to table 704 and the count value does not change (as indicated by numbers 706 and 708) when an isochronous device issues an access request that has a matched cache line 3 in the cache memory 120. The LRU index value of the cache line 3 is changed from its original value 3 (e.g., a reference value) to zero. Referring to the other cache lines, the LRU index values lower than the reference value 3 are all incremented by 1. As shown, the LRU index values of cache lines 0, 1, and 7 are all incremented by 1. In this way, the more recent isochronous access request, the lower the LRU index value, the higher priority to use the cache memory 120.

Figure 8:
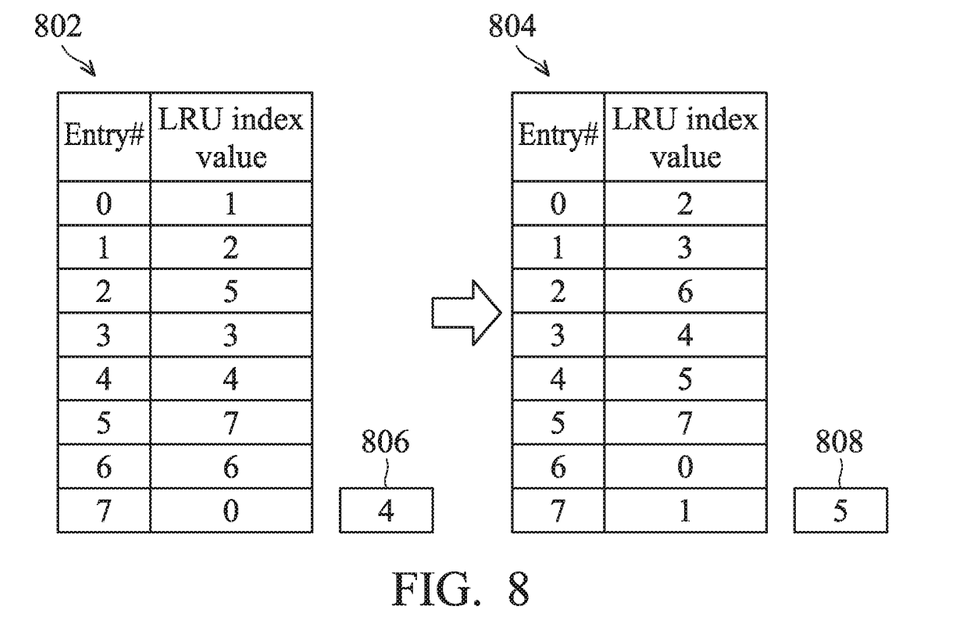

FIG. 8 shows that the LRU index management table changes from table 802 to table 804 and the count value is incremented by 1 (as indicated by numbers 806 and 808) when an isochronous device issues an access request and the computing domain of the access request has a matched cache line 6 in the cache memory 120 that is originally assigned to a general device within the same with the isochronous device. The LRU index value of the cache line 6 is changed from its original value 6 (e.g., a reference value) to zero. Referring to the other cache lines, the LRU index values lower than the reference value 6 are all incremented by 1. As shown, the LRU index values of the cache lines 0-4 and 7 are all incremented by 1. In some examples, the count value is at the upper limit before the access request. The count value at the upper limit is not incremented in response to the access request.

Figure 9:
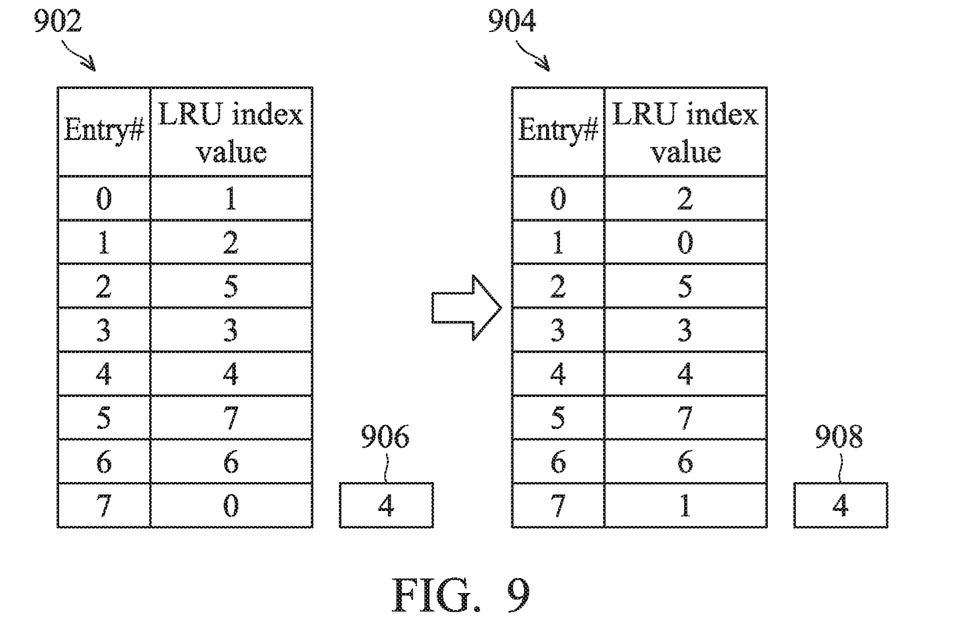

FIG. 9 shows that the LRU index management table changes from table 902 to table 904 and the count value does not change (as indicated by numbers 906 and 908) when a general device issues an access request and the computing domain of the access request has a matched cache line 1 in the cache memory 120 that is originally assigned to a isochronous device within the same with the general device. The LRU index value of the cache line 1 is changed from its original value 2 (e.g., a reference value) to zero. Referring to the other cache lines, the LRU index values lower than reference value 2 are all incremented by 1. As shown, the LRU index values of the cache lines 1 and 7 are both incremented by 1. Because the LRU index value of cache line 1 is changed to 0, the repeated access request issued by the isochronous device can be dealt with by the cached information in time.

Figure 10:
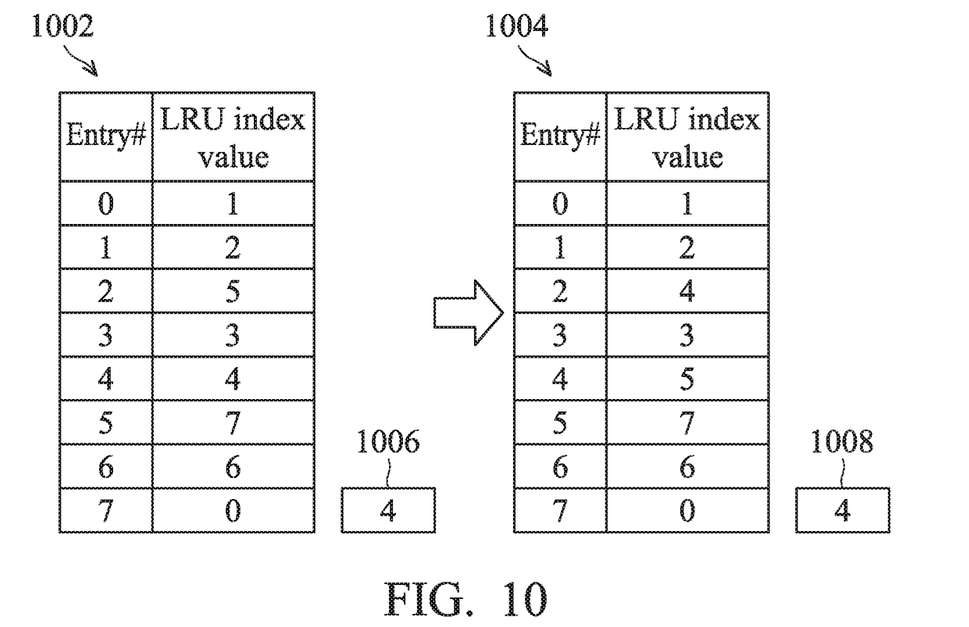

FIG. 10 shows that the LRU index management table changes from table 1002 to table 1004 and the count value does not change (as indicated by numbers 1006 and 1008) when a general device issues an access request that has a matched non-isochronous cache line 2 in the cache memory 120. The LRU index value of the cache line 2 is changed from its original value 5 (e.g., a reference value) to the count value 4. Referring to the other cache lines, the LRU index values lower than the reference value 5 but not lower than the count value 4 are all incremented by 1. As shown, the LRU index value of the cache line 4 is incremented by 1. In this way, for general devices, the more recent access request, the lower the LRU index value.

Figure 11:
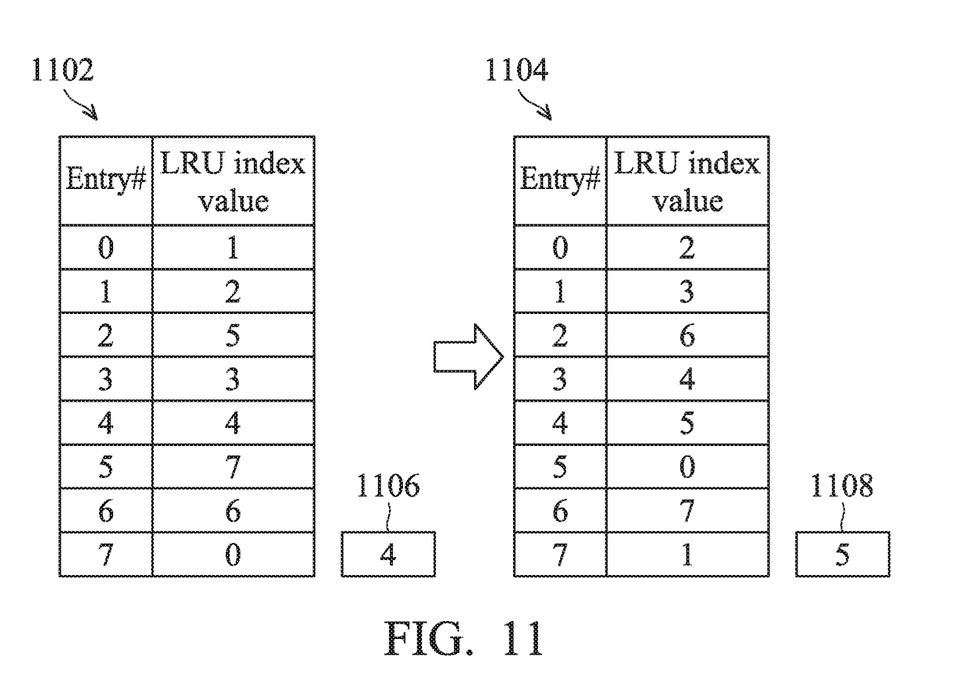

FIG. 11 shows that the LRU index management table changes from table 1102 to table 1104 and the count value is incremented by 1 (as indicated by numbers 1106 and 1108) when the LRU index management table is full but an isochronous device issues an access request. Cache line 5 at the greatest LRU index value 7 is released and assigned to the access request. The LRU index value of the cache line 5 is changed from 7 to zero for isochronous caching. Referring to the other cache lines, the LRU index values of the cache lines 0-4 and 6-7 are all incremented by 1. In some examples, the count value is at the upper limit before the access request. The count value at the upper limit is not incremented in response to the access request.

Figure 12:
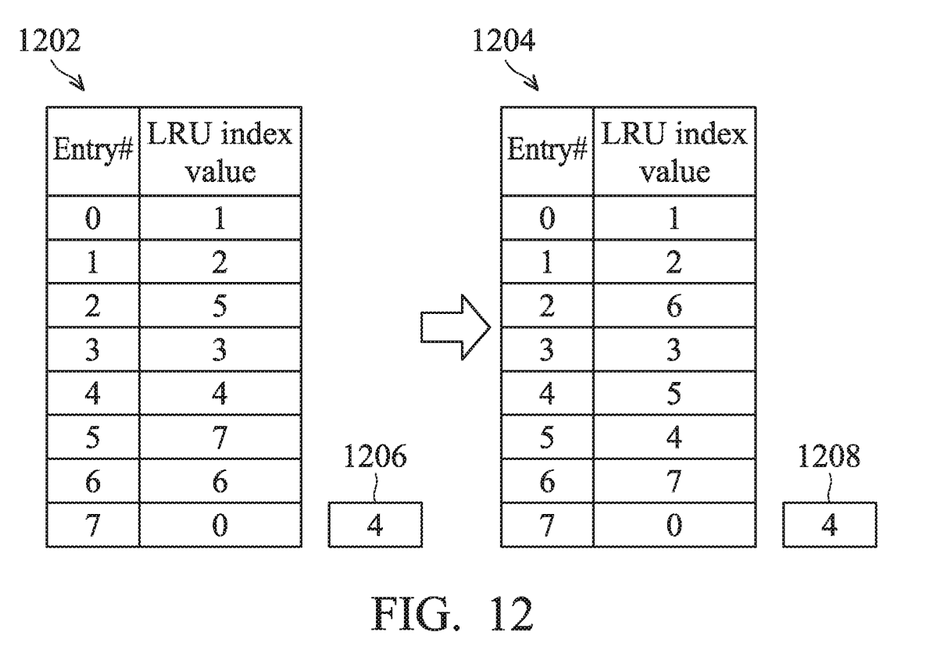

FIG. 12 shows that the LRU index management table changes from table 1202 to table 1204 and the count value does not change (as indicated by numbers 1206 and 1208) when the LRU index management table is full but a general device issues an access request. Cache line 5 at the greatest LRU index value 7 is released and assigned to the access request. The LRU index value of the cache line 5 is changed from 7 to the count value 4. Referring to the other cache lines, the LRU index values higher than the count value 4 are all incremented by 1. As shown, the LRU index values of the cache lines 2 and 6 are all incremented by 1. Because the LRU index value assigned to correspond to the general device is set to the current count value, isochronous caching takes precedence over non-isochronous caching.

In an exemplary embodiment, if no isochronous device issues any access request to the system memory 104 in a time limit, the count value is reset to zero. The cache memory 120 is not occupied by isochronous devices.

The operational logic of the cache management hardware 122 is summarized below.

When an empty cache line which is used to be assigned to a isochronous device and then assigned to correspond to a non-isochronous device, its LRU index value may be set to the count value, and the LRU index values of the other cache lines not lower than the count value may be all incremented by 1.

When a cache line corresponding to a first non-isochronous device is called by a second non-isochronous device, its LRU index value may be changed from a reference value to the count value, and the LRU index values of the other cache lines lower than the reference value without being lower than the count value may be all incremented by 1.

When a cache line corresponding to an isochronous device is called by a non-isochronous device, its LRU index value may be changed from a reference value to zero, and the LRU index values of the other cache lines lower than the reference value may be all incremented by 1.

When an empty cache line which is used to be assigned to a isochronous device and then assigned to correspond to an isochronous device, its LRU index value may be set to zero, and the LRU index values of the other cache lines may be all incremented by 1.

When a cache line corresponding to a first isochronous device is called by a second isochronous device, its LRU index value may be changed from a reference value to zero, and the LRU index values of the other cache lines lower than the reference value may be all incremented by 1.

When a cache line corresponding to a non-isochronous device is called by an isochronous device, its LRU index value may be changed from a reference value to zero, and the LRU index values of the other cache lines lower than the reference value may be all incremented by 1.

When a cache line with the greatest LRU index value is released and assigned to correspond to an isochronous device, its LRU index value may be changed to zero, and the LRU index values of the other cache lines may be all incremented by 1.

When a cache line with the greatest LRU index value is released and assigned to correspond to a non-isochronous device, its LRU index value may be changed to the count value, and the LRU index values of the other cache lines greater than the count value may be all incremented by 1.

The count value may be limited to lower than N. The difference between N and the count value is the amount of cache lines reserved for non-isochronous caching, so as to prevent all cache lines in the cache memory from being occupied by isochronous caching.

When no isochronous devices request access to the system memory during a time limit, the count value may be reset to zero.

Figure 13:
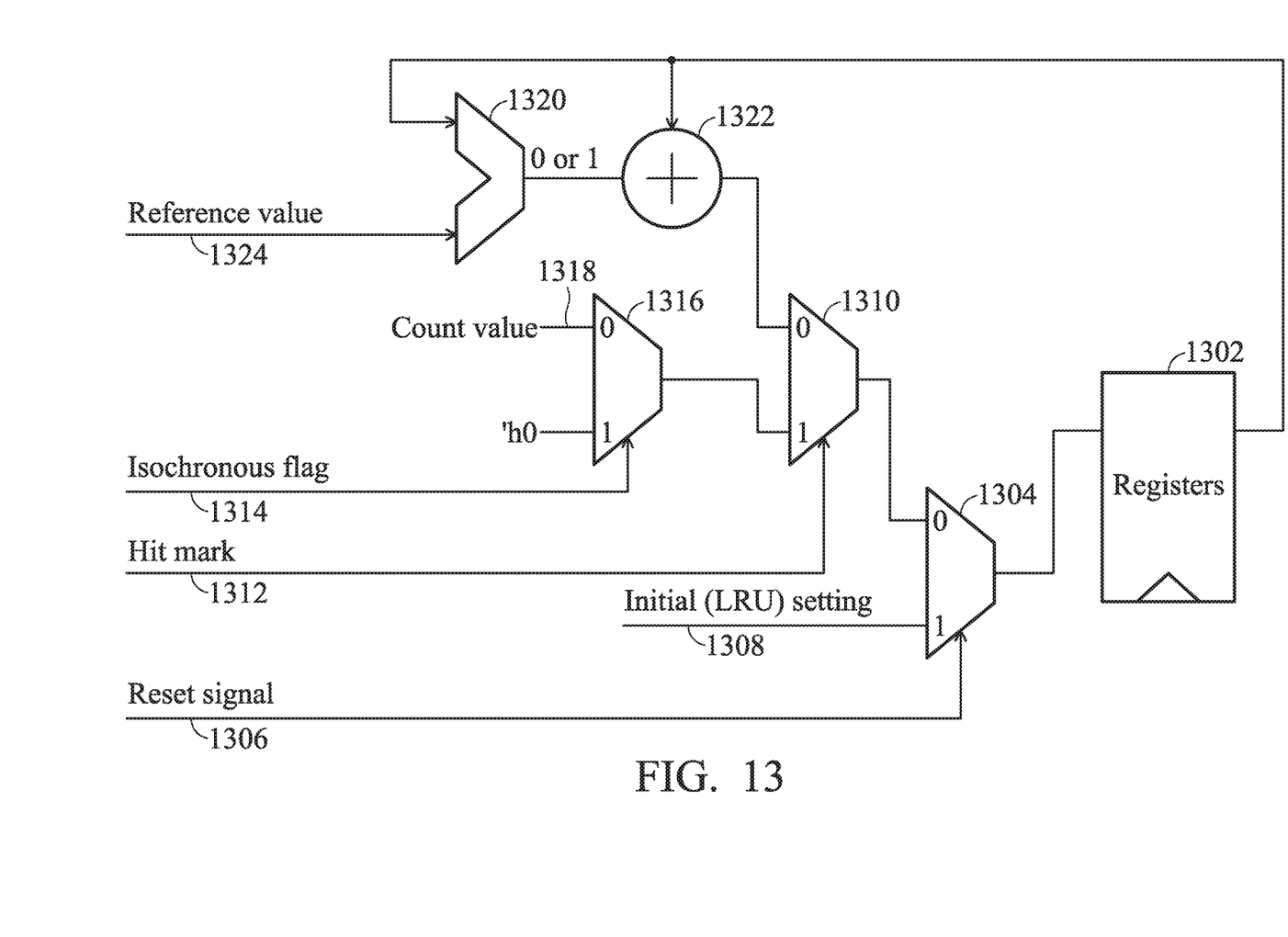
FIG. 13 illustrates the logic gates building the cache management hardware 122 in accordance with an exemplary embodiment of the present invention.

FIG. 13 illustrates the logic gates building the cache management hardware 122 in accordance with an exemplary embodiment of the present invention.

The registers 1302 stores the LRU index management table. When a reset signal 1306 is pulled up, the multiplexer 1304 fills the initial setting 1308 of the LRU index values of the different cache lines into the registers 1302.

Regarding an access request, the multiplexer 1310 performs LRU index setting according to a hit mark 1312. The hit mark 1312 shows which cache line matches the access request.

Regarding the matched cache line, the multiplexer 1316 operates according to an isochronous flag 1314. When the access request is from an isochronous device, the LRU index value of the matched cache line is set to a zero ('h0). When the access request is from a non-isochronous (general) device, the LRU index value of the matched cache line is set to a count value 1318 obtained from the counter 124. Isochronous caching takes precedence over non-isochronous caching.

Regarding the cache lines not matching the access request, their LRU index values are updated by a logic gate 1320 and an adder 1322. The original LRU index value of the matched cache line is regarded as a reference value 1324. The logic gate 1320 compares the reference value 1324 with the LRU index value of an unmatched cache line, and outputs zero or 1 as the comparison result. The output of the logic gate 1320 is passed to the adder 1322 to adjust the LRU index value of the unmatched cache line.

By the translation agent hardware 118, it is easy to build a complex computer architecture. The number of devices equipped onto a computer is more unlimited. A large-sized system memory can also be accessed quickly. For example, high computing systems such as virtual machines, multiple operating systems, servers, heterogeneous systems . . . can be easily realized according to the present invention.

The aforementioned management technology of the cache memory 120 can be implemented in a variety of hardware designs. In another exemplary embodiment, a management method for the cache memory 120 is introduced. According to the method, a translation agent hardware 118 is provided to process an access request that is issued from a device end to access a system memory 104. The translation agent hardware 118 calculates a physical address of the system memory 104. A central processing unit 112 at the host end operates a memory controller 114 to access the system memory 104 according to the physical address. A cache memory 120 is provided in the translation agent hardware 118. The cache memory 120 provides a plurality of cache lines to store translation information to accelerate the translation agent hardware 118 to calculate the physical address. Each cache line of the cache memory 120 is assigned an LRU index value. The cache lines with the greater LRU index values are preferentially released to be reassigned t. A counter 124 is provided to reflect an isochronous caching demand. The LRU index values of cache lines assigned to non-isochronous caching are kept not lower than the count value, and thereby isochronous caching takes precedence over non-isochronous caching.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system-on-chip coupled to a system memory, comprising:
a central processing unit;
a memory controller, coupled between the central processing unit and the system memory; and
a translation agent hardware, coupled to the central processing unit, wherein the translation agent hardware calculates a physical address in response to an access request for the system memory and, based on the physical address, the central processing unit operates the memory controller to access the system memory,
wherein the translation agent hardware further comprising:
a cache memory that provides a plurality of cache lines to store translation information for calculation of the physical address;
a cache management hardware, using which each cache line is assigned a last-recently used
(LRU) index value, cache lines with greater LRU index values are preferentially released to be reassigned; and
a counter, which provides a count value showing an isochronous caching demand to use the cache lines of the cache memory,
wherein the cache management hardware keeps LRU index values of cache lines assigned to non-isochronous caching not lower than the count value, and thereby isochronous caching takes precedence over non-isochronous caching, wherein:
LRU index values of different cache lines have integers from zero to (N−1) for setting;
N is a total amount of cache lines; and the LRU index values of the different cache lines are different and are decremented from a start cache line to an end cache line in an initial setting.

2. The system-on-chip as claimed in claim 1, wherein:
when an empty cache line is assigned to correspond to a non-isochronous device, its LRU index value is set to the count value, and LRU index values of the other cache lines not lower than the count value are all incremented by 1.

3. The system-on-chip as claimed in claim 1, wherein:
when a cache line corresponding to a first non-isochronous device is called by a second non-isochronous device, its LRU index value is changed from a reference value to the count value, and the LRU index values of the other cache lines lower than the reference value without being lower than the count value are all incremented by 1.

4. The system-on-chip as claimed in claim 1, wherein:
when a cache line corresponding to an isochronous device is called by a non-isochronous device, its LRU index value is changed from a reference value to zero, and the LRU index values of the other cache lines lower than the reference value are all incremented by 1.

5. The system-on-chip as claimed in claim 1, wherein:
when an empty cache line is assigned to correspond to an isochronous device, its LRU index value is set to zero, and the LRU index values of the other cache lines are all incremented by 1.

6. The system-on-chip as claimed in claim 1, wherein:
when a cache line corresponding to a first isochronous device is called by a second isochronous device, its LRU index value is changed from a reference value to zero, and the LRU index values of the other cache lines lower than the reference value are all incremented by 1.

7. The system-on-chip as claimed in claim 1, wherein:
when a cache line corresponding to a non-isochronous device is called by an isochronous device, its LRU index value is changed from a reference value to zero, and the LRU index values of the other cache lines lower than the reference value are all incremented by 1.

8. The system-on-chip as claimed in claim 1, wherein:
when a cache line with the greatest LRU index value is released and assigned to correspond to an isochronous device, its LRU index value is changed to zero, and the LRU index values of the other cache lines are all incremented by 1; and
when a cache line with the greatest LRU index value is released and assigned to correspond to a non-isochronous device, its LRU index value is changed to the count value, and the LRU index values of the other cache lines greater than the count value are all incremented by 1.

9. The system-on-chip as claimed in claim 1, wherein:
the count value is limited to lower than N; and
one difference between N and the count value is an amount of cache lines reserved for non-isochronous caching.

10. The system-on-chip as claimed in claim 1, wherein:
when no isochronous devices request access to the system memory during a time limit, the count value is reset to zero.

11. A method to access a system memory, comprising:
providing translation agent hardware to calculate a physical address in response to an access request for the system memory, wherein based on the physical address a central processing unit operates a memory controller to access the system memory;
providing a cache memory in the translation agent hardware, wherein the cache memory provides a plurality of cache lines to store translation information for calculation of the physical address;
assigning each cache line a last-recently used (LRU) index value, wherein cache lines with greater LRU index values are preferentially released to be reassigned;
counting a count value showing an isochronous caching demand to use the cache lines of the cache memory; and
keeping LRU index values of cache lines assigned to non-isochronous caching not lower than the count value, and thereby isochronous caching takes precedence over non-isochronous caching, wherein:
LRU index values of different cache lines have integers from zero to (N−1) for setting;
N is the total amount of cache lines; and
the LRU index values of the different cache lines are different and are decremented from the start cache line to the end cache line in the initial setting.

12. The method as claimed in claim 11, wherein:
when an empty cache line is assigned to correspond to a non-isochronous device, its LRU index value is set to the count value, and the LRU index values of the other cache lines not lower than the count value are all incremented by 1.

13. The method as claimed in claim 11, wherein:
when a cache line corresponding to a first non-isochronous device is called by a second non-isochronous device, its LRU index value is changed from a reference value to the count value, and the LRU index values of the other cache lines lower than the reference value without being lower than the count value are all incremented by 1.

14. The method as claimed in claim 11, wherein:
when a cache line corresponding to an isochronous device is called by a non-isochronous device, its LRU index value is changed from a reference value to zero, and the LRU index values of the other cache lines lower than the reference value are all incremented by 1.

15. The method as claimed in claim 11, wherein:
when an empty cache line is assigned to correspond to an isochronous device, its LRU index value is set to zero, and the LRU index values of the other cache lines are all incremented by 1.

16. The method as claimed in claim 11, wherein:
when a cache line corresponding to a first isochronous device is called by a second isochronous device, its LRU index value is changed from a reference value to zero, and the LRU index values of the other cache lines lower than the reference value are all incremented by 1.

17. The method as claimed in claim 11, wherein:
when a cache line corresponding to a non-isochronous device is called by an isochronous device, its LRU index value is changed from a reference value to zero, and the LRU index values of the other cache lines lower than the reference value are all incremented by 1.

18. The method as claimed in claim 11, wherein:
when a cache line with the greatest LRU index value is released and assigned to correspond to an isochronous device, its LRU index value is changed to zero, and the LRU index values of the other cache lines are all incremented by 1; and
when a cache line with the greatest LRU index value is released and assigned to correspond to a non-isochronous device, its LRU index value is changed to the count value, and the LRU index values of the other cache lines greater than the count value are all incremented by 1.

19. The method as claimed in claim 11, wherein:
the count value is limited to lower than N; and
the difference between N and the count value is the amount of cache lines reserved for non-isochronous caching.

20. The method as claimed in claim 11, wherein:
when no isochronous devices request access to the system memory during a time limit, the count value is reset to zero.

* * * * *